US012749616B2

(12) United States Patent
Quinn et al.

(10) Patent No.: US 12,749,616 B2
(45) Date of Patent: Sep. 29, 2026

(54) ELECTRIC TRANSFORMER WITH AN INCREASED TOTAL LEAKAGE IMPEDANCE

(71) Applicant: Exxelia, Paris (FR)

(72) Inventors: Victor William Quinn, Rush, NY (US); Benoit Bertrand Hugues Krafft, Brin sur Seille (FR)

(73) Assignee: Exxelia, Paris (FR)

( * ) Notice: Subject to any disclaimer, the term of this patent is extended or adjusted under 35 U.S.C. 154(b) by 1239 days.

(21) Appl. No.: 17/691,847

(22) Filed: Mar. 10, 2022

(65) Prior Publication Data

US 2023/0290565 A1 Sep. 14, 2023

(51) Int. Cl.
*H01F 27/34* (2006.01)
*H01F 27/02* (2006.01)
(Continued)

(52) U.S. Cl.
CPC ........... *H01F 27/346* (2013.01); *H01F 27/02* (2013.01); *H01F 27/24* (2013.01); *H01F 27/306* (2013.01)

(58) Field of Classification Search
CPC ........ H01F 27/02; H01F 27/24; H01F 27/303; H01F 27/306; H01F 27/346; H01F 38/08; H01F 2027/348; H01F 27/325; H01F 5/02; H01F 2005/022; H01F 2005/025; H01F 2005/027
(Continued)

(56) References Cited

U.S. PATENT DOCUMENTS 2,553,324 A * 5/1951 Lord ........................ H01F 27/36 336/84 R
2,929,016 A * 3/1960 Kreuzer .................... H02J 3/38 336/12
(Continued)

FOREIGN PATENT DOCUMENTS

CN 102436914 A * 5/2012
JP 2014127471 A * 7/2014 ............. H01F 27/28
(Continued)

*Primary Examiner* — Tszfung J Chan
(74) *Attorney, Agent, or Firm* — Maine Cernota & Curran

(57) ABSTRACT

An electric transformer comprising a first magnetic circuit coupling a primary coil and a secondary coil, the first magnetic circuit comprising a first limb extending along a vertical axis, the primary coil comprising inner and outer primary coils connected in series, the inner primary coil, the secondary coil, and the outer primary coil being cylindrical and arranged concentrically around the first limb, wherein the inner primary coil, the secondary coil and the outer primary coil are mounted in a manner to maintain a predefined inner gap between the inner primary coil and the secondary coil and a predefined outer gap between the secondary coil and the outer primary coil, the inner and outer gaps being evaluated along a radial direction relative to the vertical axis, the inner and outer gaps increasing a leakage of a magnetic flux between the first coil and the secondary coil. The electric transformer comprising an additional second magnetic circuit having selected limb(s) that pass through predefined gap(s) between coils thereby providing preferred increase in leakage magnetic flux between the first coil and the secondary coil.

9 Claims, 5 Drawing Sheets

(51) Int. Cl.
*H01F 27/24* (2006.01)
*H01F 27/30* (2006.01)

(58) Field of Classification Search
USPC ....... 336/182, 183, 185, 196, 197, 198, 199, 336/207, 208, 210, 212, 214, 221, 222
See application file for complete search history.

(56) References Cited

U.S. PATENT DOCUMENTS

| | | | | | |
|---|---|---|---|---|---|
| 5,404,123 | A * | 4/1995 | Joseph | H01F 5/02 336/208 |
| 6,967,559 | B2 * | 11/2005 | Beland | H02M 7/49 29/605 |
| 2002/0057180 | A1 * | 5/2002 | Shirahata | H01F 30/12 336/213 |
| 2010/0194306 | A1 * | 8/2010 | Sugimura | H01F 27/30 336/170 |
| 2013/0033351 | A1 * | 2/2013 | Kim | H01F 27/38 336/170 |

FOREIGN PATENT DOCUMENTS

| | | | | |
|---|---|---|---|---|
| KR | 102313650 B1 * | 10/2021 | H01F 27/325 |
| WO | WO-2021074996 A1 * | 4/2021 | H01F 38/08 |

* cited by examiner

ELECTRIC TRANSFORMER WITH AN INCREASED TOTAL LEAKAGE IMPEDANCE

FIELD OF THE INVENTION

The present invention relates to an electric transformer, more particularly a power transformer.

BACKGROUND OF THE INVENTION

Generally speaking, an electric transformer comprises at least a primary winding and at least one secondary winding, coupled magnetically one with the other by a magnetic circuit. The magnetic circuit, also called a magnetic core, comprise limbs and yokes forming at least one closed magnetic loop. The primary winding and the secondary winding are wound around the same or two different limb(s) of the magnetic circuit.

Electrically speaking, as illustrated by the equivalent circuit of FIG. 1, a real transformer 10 can be represented by an ideal transformer 11 and a leakage inductance LS in series with a losses resistance RS. The leakage inductance LS is conventionally represented in series with the primary winding of the transformer but, as shown in FIG. 1, it can as well be represented in series with the secondary coil of the transformer (taking into account the turns ratio of the transformer). The leakage inductance LS and the losses resistance RS together form an equivalent leakage impedance, that can significantly affect the operation of the transformer.

The ideal transformer 11 has a primary winding 12 made of n1 turns, and a secondary winding 14 made of n2 turns. A magnetic circuit 13 guides mutual magnetic field lines from the primary winding 12 to the secondary winding 14. When an electric potential V1 is applied between the terminals of the primary winding 12 of the ideal transformer 11, the electric potential generated between the terminals of the secondary winding 14 is given by: $(n2/n1)\times V1$. At the same time, if an electric current I1 flows through the primary winding 12, the electric current I2 generated through the secondary winding 14 is given by: $(n1/n2)\times I1$. The voltage gain of the real transformer 10 differs from the voltage gain (n2/n1) of the ideal transformer 11 due to the effects of the equivalent leakage impedance (LS and RS).

The losses resistance RS represents the power lost in the form of heat, by Joule effect, in the conductors.

The leakage inductance LS represents leakage flux effects caused by magnetic field lines that are not mutually shared by both primary and secondary windings, i.e. a fraction of the magnetic flux generated by the primary winding does not pass through the loop formed by the secondary winding, and/or a fraction of the magnetic flux generated by the secondary winding does not pass through the loop formed by the primary winding.

The value of the leakage inductance LS depends on several parameters, in particular the structure of each winding (like the specific dimensional separation between turns or layers of the winding) or the effective shape given to the primary and secondary windings.

Since this structure and/or shape may differ from one transformer to the other, even along a common production line, the leakage inductance LS presents a great variability. As a result, the leakage impedance tolerances of commercial transformers are wide. The tolerance is generally expressed as a percentage (the deviation from the average value divided by the average value). It can be of more than 50%.

Besides, modern power electronics convertors for example often benefit from a significant and consistent leakage impedance. However, the leakage impedance generated by the transformer winding configuration may not be sufficient in particular when the winding configuration of the transformer is designed with the constraints of providing a preferred reduction of loss and/or a preferred efficiency.

Consequently, a particular real transformer has to be associated with additional discrete inductive or capacitive components to increase or otherwise adjust the value of the total leakage inductance of the transformer, as required by the circuit in which this particular transformer is used. This adjustment is a burden for the circuit manufacturer. In addition, the additional components make the circuit bulky and may cause ongoing tuning operations in production, since the values of the additional components to be added are based on the leakage inductance value of the transformer prior to adjustment.

SUMMARY OF THE INVENTION

This invention addresses these issues by providing an electric transformer with a controlled and definite leakage impedance that may be significantly increased while providing a preferred winding configuration that reduces loss or increases efficiency as needed.

A first aspect of the present invention provides a winding configuration with multiple layers defining primary and secondary windings, a gap being provided between selected layers in order to increase the effective leakage impedance of the transformer and thus setting a total leakage impedance of the electric transformer at a predefined value.

A second aspect of the present invention provides an electric transformer comprising a second magnetic circuit forming a magnetic loop around one selected layer, the second magnetic circuit having limbs positioned in the gaps between the selected layers, the second magnetic circuit being embedded within the layers in order to magnify the effective leakage impedance of the transformer, by providing separate and isolated magnetic flux paths or mutual flux paths as preferred, and thus setting the total leakage impedance of the electric transformer at a predefined value.

A third aspect of the invention provides an electric transformer comprising a frame of support to position the selected layers and maybe the second magnetic circuit in order to improve dimensional control of interlayer gaps and thus reduce leakage impedance variations that would normally occur from inherent variation of interlayer.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
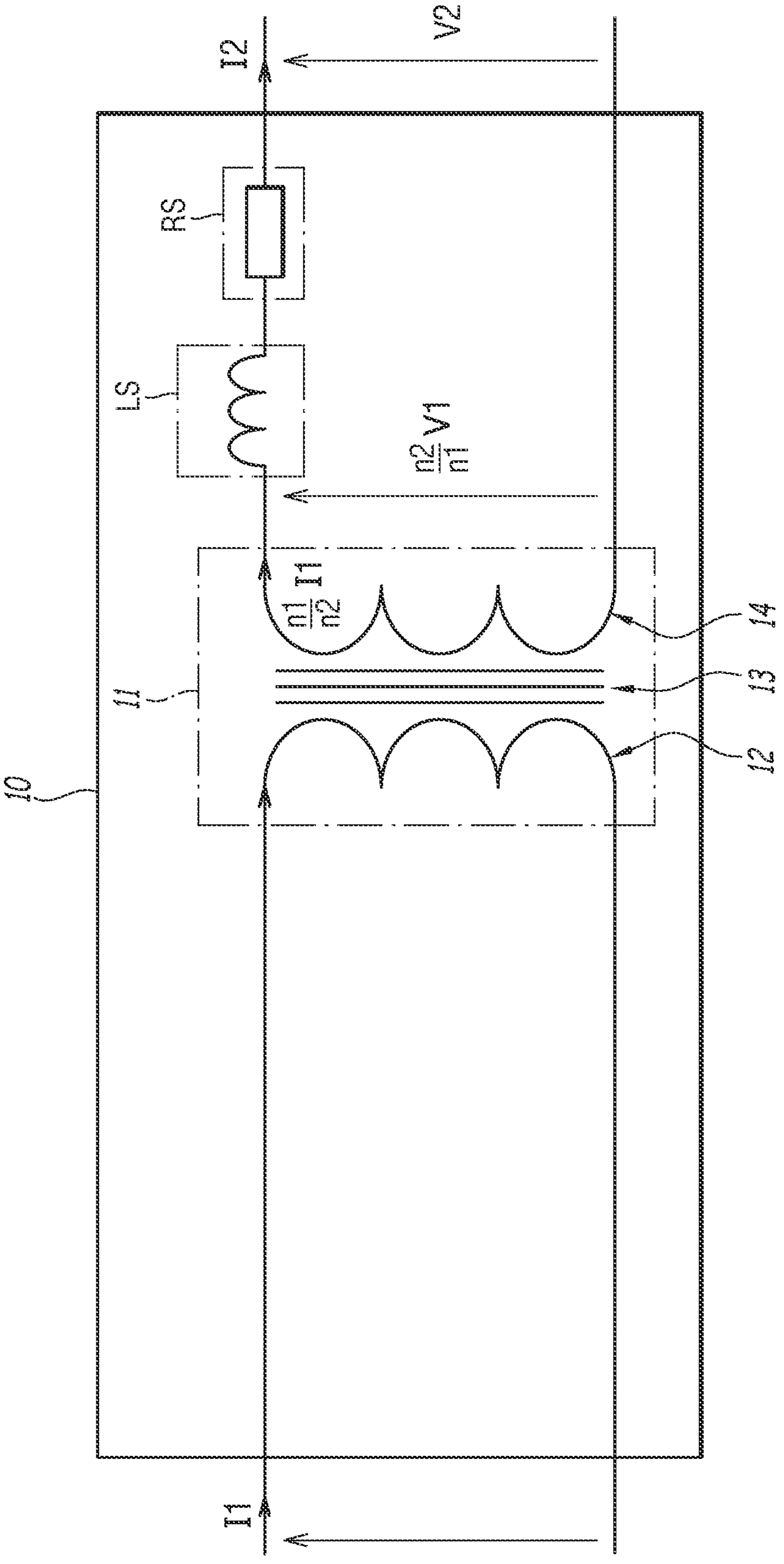
FIG. 1 is an electric representation of a circuit equivalent to a real transformer.
Figure 2:
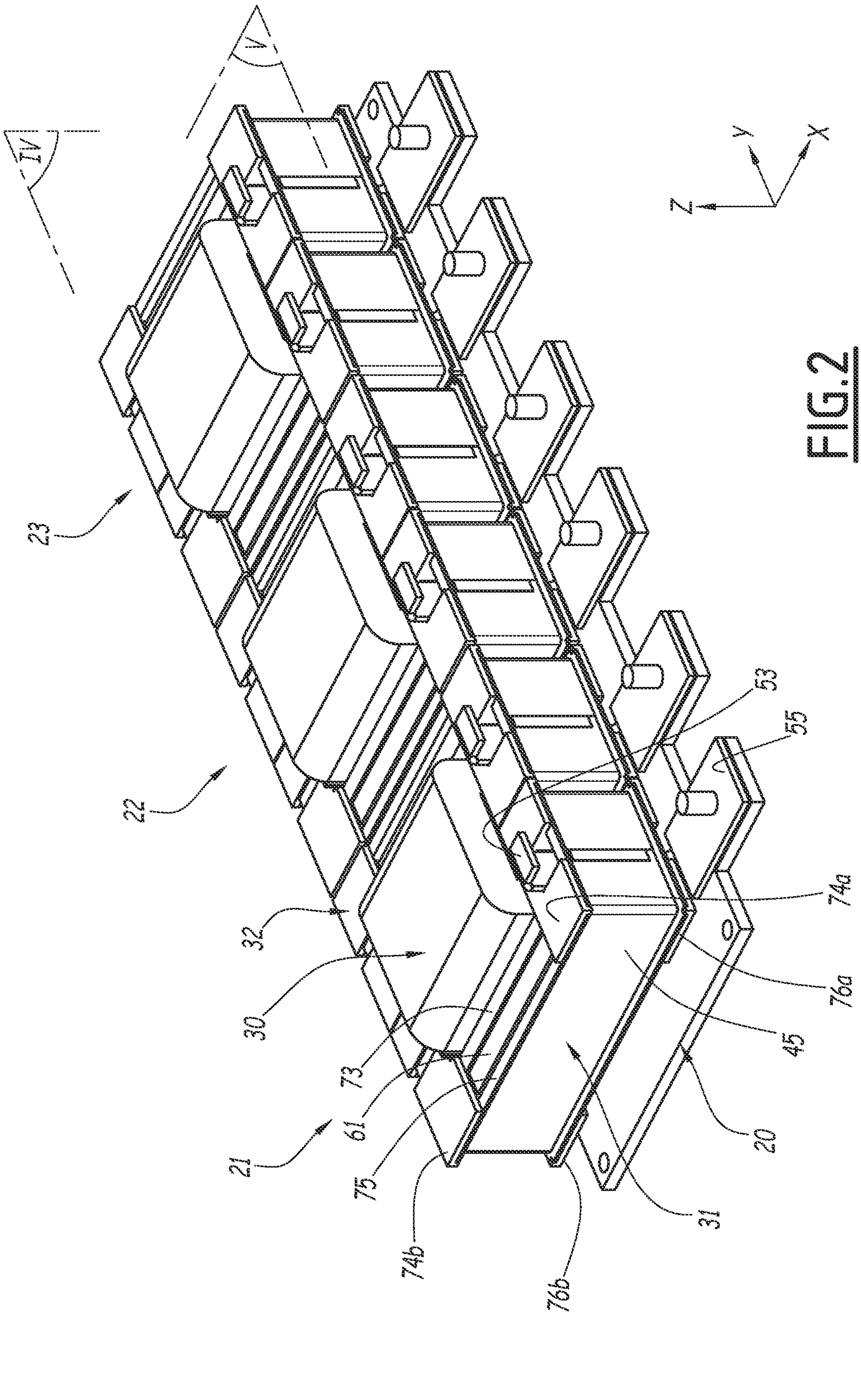
FIG. 2 is a perspective view of a preferred embodiment of an electric transformer according to the invention.

FIGS. 2 to 5 illustrate a three-phase power transformer comprising three identical elementary electric transformers 21, 22 and 23, mounted side by side on a mounting plate 20.

Axis X, Y and Z define a system of reference attached to the mounting plate 20. The orientation of this system of reference is arbitrarily. However, to ease the present description, axis Z is said vertical, while axis X and Y define a plane that is said horizontal, i.e. orthogonal to the vertical axis Z. The adjectives "upper" and "lower" correspond to relative positions along axis Z, "left" or "right" correspond to relative position along axis Y, and "front" or "rear" correspond to relative positions along axis X.

In the following, the elementary electric transformer 21 is more particularly disclosed, knowing that the same presentation could be made for the elementary electric transformers 22 and 23.

The elementary electric transformer 21 comprises a first magnetic circuit 30, a left winding assembly 31 and a right winding assembly 32. The left and right assemblies are symmetric relative to a vertical median plan, parallel to the XZ plane and passing through the middle of the elementary electric transformer 21.

The left winding assembly 31 comprises a primary coil 41, a secondary coil 51, a second magnetic circuit 61 and a frame 71.

Similarly, the right winding assembly 32 comprises a primary coil 42, a secondary coil 52, a second magnetic circuit 62 and a frame 72.

First Magnetic Circuit 30

The first magnetic circuit 30 is preferably made of a core using wound ribbon composed of nanocrystalline material. Alternatively the first magnetic circuit is made of ferrite, lamination, or agglomerated magnetic powder.

More particularly, the first magnetic circuit 30 results of the assembly of two "C" shaped pieces, respectively an upper piece 33 and a lower piece 34, in order to form a closed magnetic loop, whose normal direction is along axis X. The first magnetic circuit 30 is thus provided with a passage or opening along the X axis.

When assembled, the first magnetic circuit 30 presents two parallel limbs, **33*a* and 33*b*, and 34*a* and 34*b*, that are connected by an upper and a lower yokes, 35 and 36** respectively.

The horizontal cross section of one limb, i.e. the cross-section along a horizontal plane XY, is preferably rectangular.

Primary Coil 41 of the Left Winding Assembly 31

The primary coil 41 is made of an inner primary coil 43 and an outer primary coil 45, connected in series one with the other, so that a free end of the inner primary coil 43 and a free end of the outer primary coil 45 constitute the terminals of the primary coil 41.

The inner primary coil 43 is made of a plurality of inner primary turns, advantageously made using a single ribbon made of a single solid conductive material.

Alternatively, a wire is used, preferably made of multiple filaments of conductive material twisted together.

The conductive material may be composed of copper, aluminum, an alloy of copper or aluminum, or another conductive metal.

The conductive material is insulated with an insulating film. Alternatively, it may be insulated with a dielectric coating or one or several insulating layer(s) wrapped around the conductive material to provide insulation on the surface of the conductive material.

Each inner primary coil 43 is wound around an internal wall 73 of the frame 71 as it will be described later, so as to form one loop around the first limb **33*a*-34*a* of the first magnetic circuit 30**. The direction normal to this loop is along the vertical axis Z.

In the embodiment shown, the inner primary coil 43 has a cylindrical shape, whose base is a rectangle and whose generating line is parallel to the axis Z. The height of the inner primary coil 43 (evaluated along the axis Z) is slightly less than the height H of the first limb.

Similarly, the outer primary coil 45 is made of a plurality of outer primary turns, advantageously made using a single ribbon. The outer primary coil 45 is wound around an external wall 75 of the frame 71 as it will be described later, so as to form one loop around the first limb **33*a*-33*b* of the first magnetic circuit 30. The direction normal to the loop of the outer primary coil 43** is along the axis Z.

In the embodiment shown, the outer primary coil 45 has a cylindrical shape, whose base is a rectangle and whose generating line is parallel to the axis Z. The height of the outer primary coil 45 is slightly less than the height H of the first limb.

Secondary Coil 51 of the Left Winding Assembly 31

The secondary coil 51 is wound around the first limb **33*a*-34*a* of the first magnetic circuit 30**.

The secondary coil 51 is advantageously made of a metal plate that is formed using preferred tooling to form one loop around the first limb **33*a*-34*a* of the first magnetic circuit 30. The direction normal to the loop formed by the inner primary coil 43** is along the axis Z.

In the embodiment shown, the secondary coil 51 has a cylindrical shape, whose base is a rectangle and whose generating line is parallel to the axis Z. The secondary coil 51 thus has four sides: a front side, an inner side 58, a rear side and an outer side 59. The height of the secondary coil 51 is less than the height H of the first limb.

The dimensions of the primary and secondary coils are so that the inner primary coil 43 can be accommodated inside the secondary coil 51, while maintaining a predefined inner gap G1 between these two coils, and so that the secondary coil 51 can be accommodated inside the outer primary coil 45, while maintaining a predefined outer gap G2 between these two coils. The gaps are measured in a transverse direction relative to the vertical Z axis.

The inner primary coil, the secondary coil and outer primary coil are thus concentrically arranged. They form a first column around the first limb of the first magnetic circuit. Each coil constitutes a layer of this first column.

The free ends of the secondary coil 51, making the front side of the secondary coils 51, constitute the terminals, 53 and 55, of the secondary coil 51. The rear side of the secondary coils 51 is provided with a retaining bracket 57, that may also be used to enhance heat transfer from the secondary coil to the base plate 20.

By maintaining gaps between the primary coil and the secondary coil, the fraction of the magnetic flux generated by one coil that does not pass through the other coil, i.e. the leakage magnetic flux, is increased, thus increasing the total leakage impedance of the transformer. The design of these gaps allows the setting of the total leakage impedance at a predefined value, while keeping the specific configuration allowing to reach a preferred reduction of loss and/or a preferred efficiency.

Second Magnetic Circuit 61 of the Left Winding Assembly 31

A second magnetic circuit 61 is advantageously used to amplify the intensity of the leakage magnetic field in the gaps between the inner and outer primary coil 43 and 45 and the secondary coil 51, at least on a portion of said secondary coil 51. This amplification of the intensity of the leakage magnetic field causes an increase in leakage magnetic field energy and therefore of the effective leakage impedance of the transformer. The design of this second magnetic circuit allows the setting of the total leakage impedance at a predefined value. This value is higher than the value reached when the winding assembly is provided by gaps only.

More particularly, the second magnetic circuit 61 comprises a core, made of a ferrite material. Alternatively, it is made of lamination, wound ribbon, or agglomerated magnetic powder.

The second magnetic circuit 61 forms a closed magnetic loop around a portion of the secondary coil 51. The inner and outer primary coils are thus outside this closed magnetic loop. The second magnetic circuit 61 extends on a fraction of the perimeter of the loop formed by the secondary coil 51 around the first magnetic circuit 30.

In the embodiment shown, the second magnetic circuit 61 has a rectangular shape both in vertical and horizontal cross-section. The thickness of the wall of the second magnetic circuit 61 is preferably constant.

In a vertical cross-section, the wall of the second magnetic circuit 61 defines two vertical limbs, 63 and 64, connected by two horizontal yokes 65 and 66. Advantageously, the dimensions of the internal contour of the vertical cross section of the second magnetic circuit 61, delimiting a passage for the secondary coil 51, fits those of the side 59 of secondary coil 51. The dimensions of the external contour of the vertical cross section fit those of the interspace between the inner and outer primary coils.

In the embodiment shown, the portion of secondary coil 51 adjacent to the second magnetic circuit 61 is the outer side 59, since the inner side 58 goes through the first magnetic circuit and that it would be difficult to accommodate the second magnetic circuit inside the hollow passage in the first magnetic circuit 30, even if such an alternative embodiment is conceivable.

For example, the second magnetic circuit 61 covers the entire outer side of the secondary coil 51. In a horizontal plane transvers to the Z axis, the length L of the second magnetic circuit 61 is shown roughly the length of the outer side 59 of secondary coil 51.

As the amplification factor of the intensity of the leakage magnetic flux depends of the area of the horizontal cross-section of the second magnetic circuit, the thickness of limbs 63 and 64 along the Y direction may be reduced from the increase of the length of limbs 63 and 64 along the X direction.

This second magnetic circuit may be provided with air gaps. They are preferably distributed along the height (i.e. along the Z axis) of the second magnetic circuit to reduce eddy current loss effects they generate in nearby conductors. Advantageously, the second magnetic circuit may have limbs extended in the Z direction above or under the primary and secondary coils, and the air gaps are then located below or above the primary and secondary coils to reduce eddy current loss generated by these air gaps in conductor layers within the coil.

The second magnetic circuit may be thus embedded in the first column outwardly delimited by the outer primary coil or may extend past the length of the primary coil since otherwise the maximum height of the transformer is established by the height of core 30 providing the first magnetic circuit.

The second magnetic circuit may be appropriately insulated from the adjacent conductor layers with wraps of insulation, dielectric coatings, discrete film insulation, plastic insulating sleeve or similar.

The winding assembly with embedded additional core limbs thus realized is particularly compact.

Frame 71 of the Left Winding Assembly 31

Figure 3:
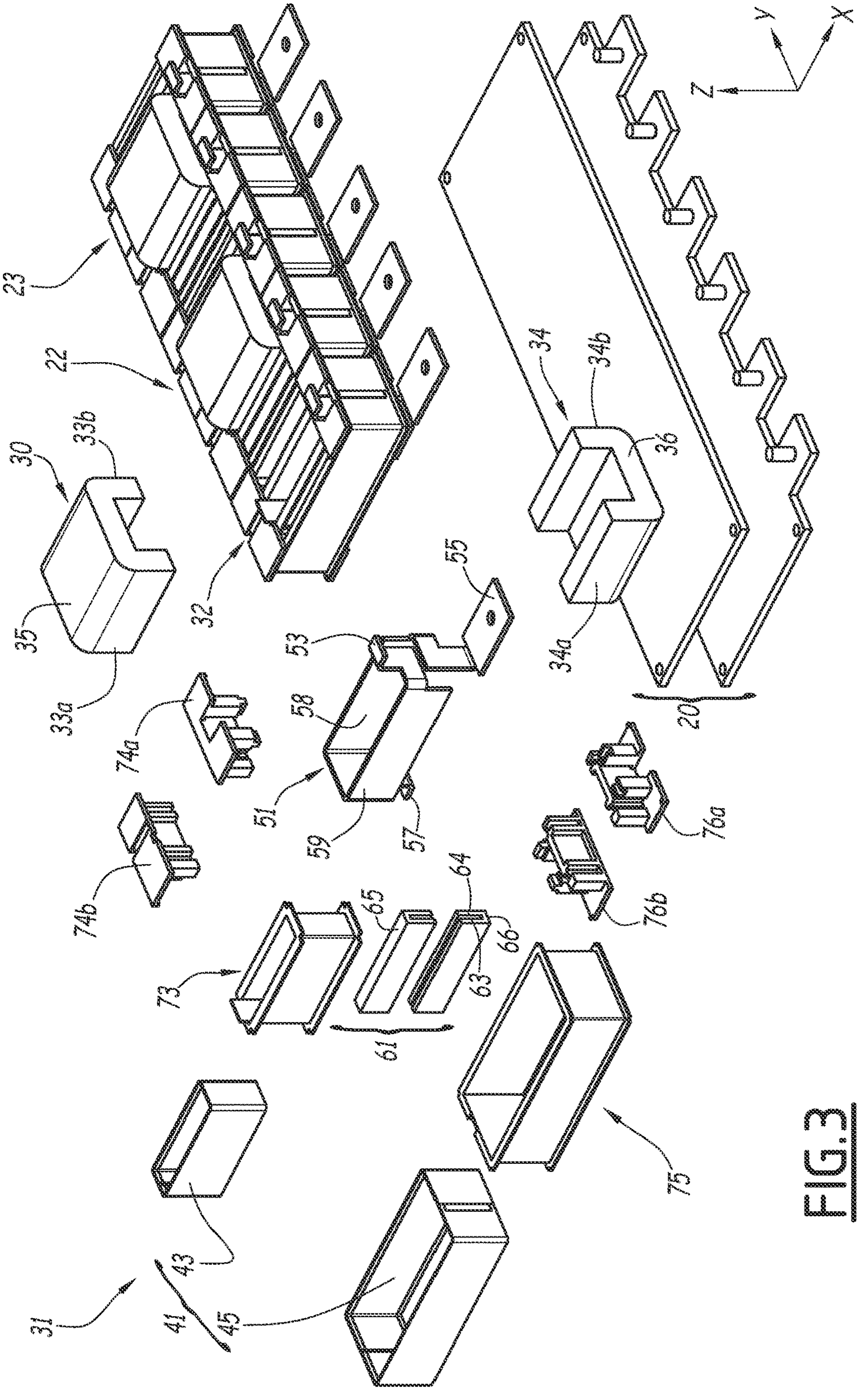
FIG. 3 is a perspective view of the transformer of FIG. 2 with an exploded representation of one winding assembly of one of the elementary transformers.
Figure 4:
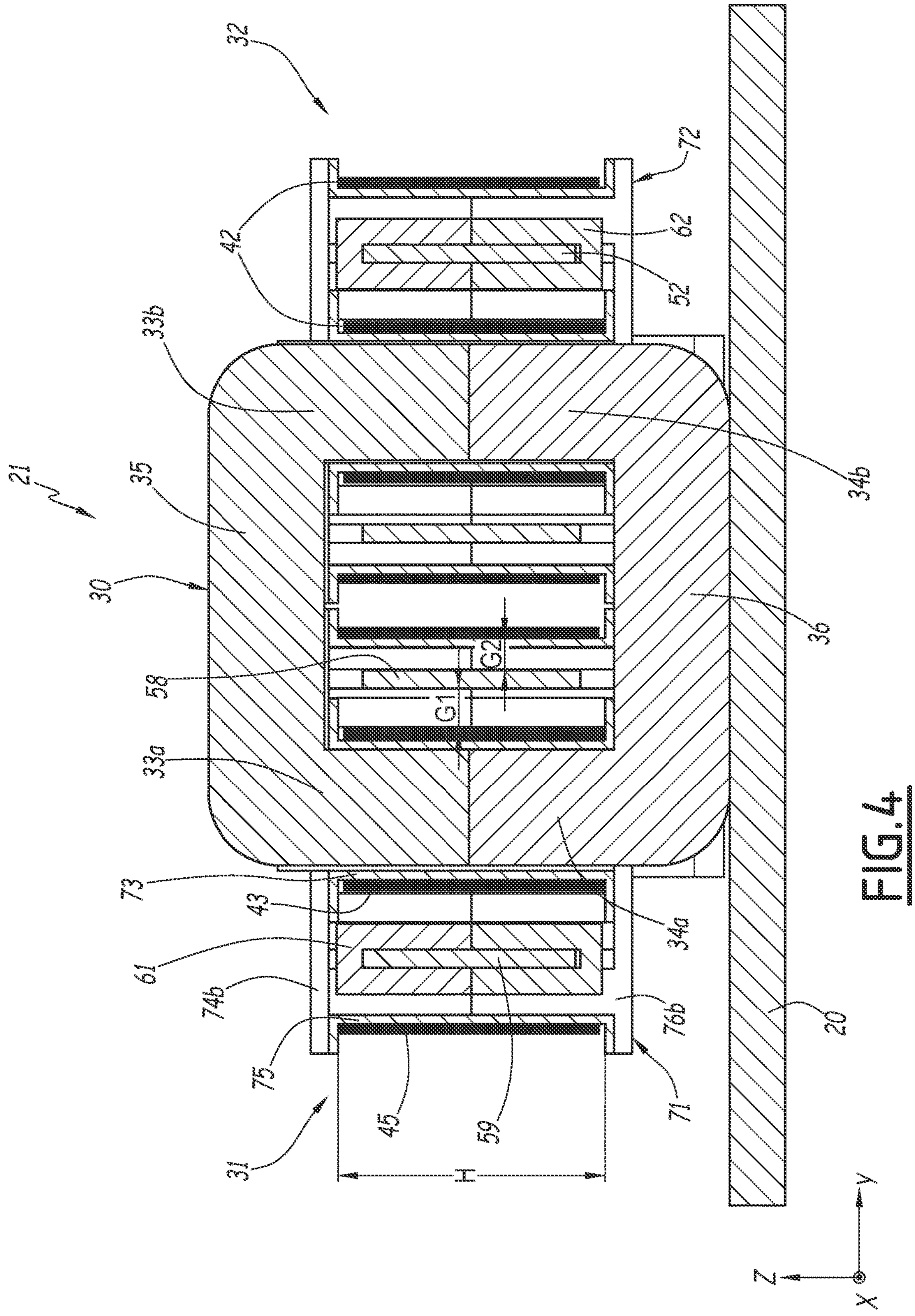
FIG. 4 is a cross-section along a "vertical" median plane of the transformer of FIG. 2.
Figure 5:
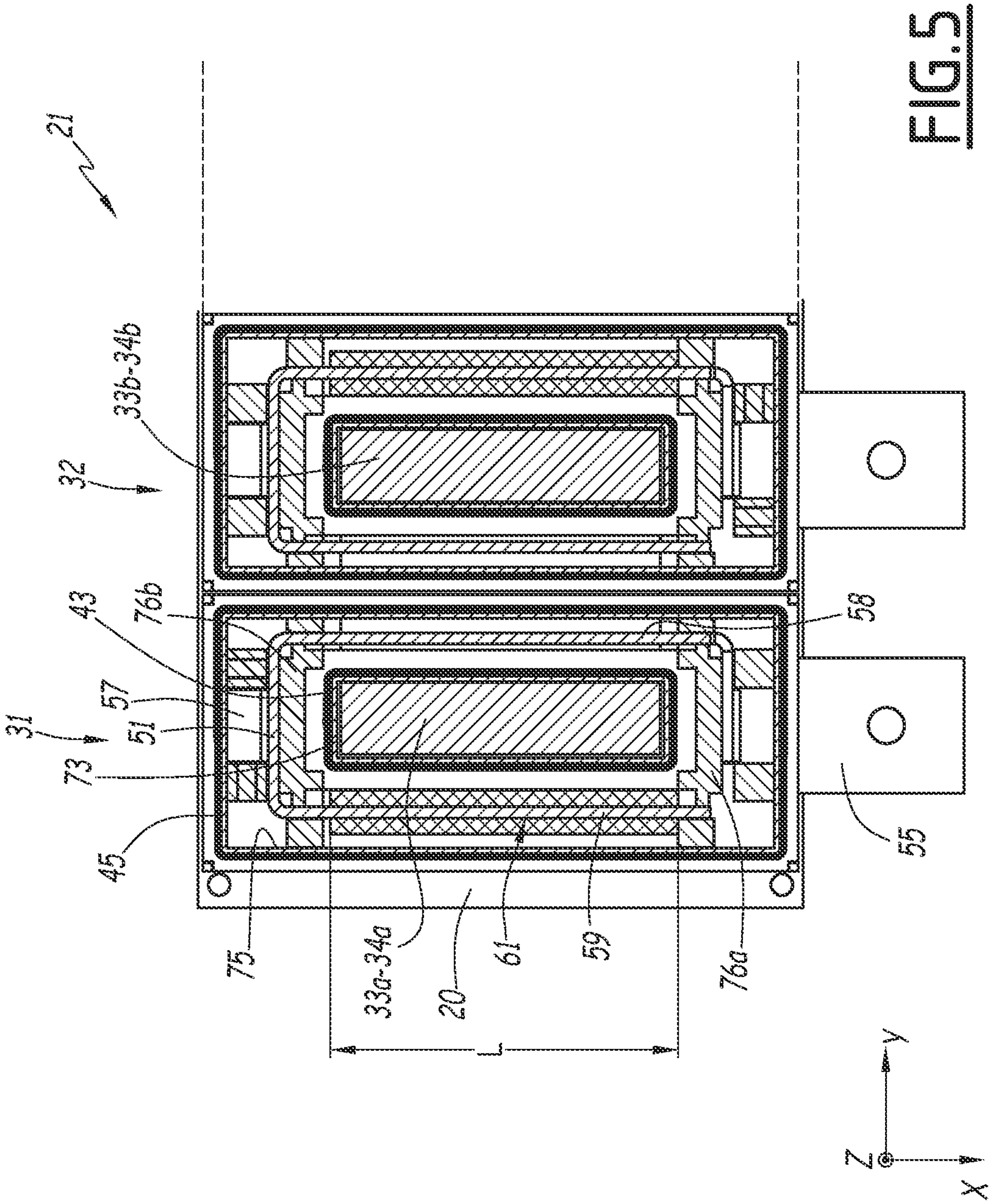
FIG. 5 is a cross-section along an "horizontal" median plane of the transformer of FIG. 2.

As represented in exploded view in FIG. 3, the frame 71 is made up of four components: an internal wall 73, an external wall 75, a front spacer **74*a*-76*a* and a rear spacer 74*b*-76*b***.

The components of the frame are for example made of a suitable plastic.

The internal wall 73 is cylindrical so as to define a through hole along axis Z suitable for accommodating the first limb **33*a*-34*a* of the first magnetic circuit 30. Preferably, the internal wall fit precisely the outer surface of the first limb 33*a*-34*a*, the through hole thus having a rectangular cross section along a horizontal plane XY. The inner primary coil 43 is wound on the surface of the internal wall 73 opposite the surface of the internal wall 73 oriented toward the first limb 33*a*-34*a* of the primary magnetic circuit 31**.

The edges of the internal wall 73 are raised outwardly (i.e. away from the first limb) to define a groove to receive the inner primary coil 43.

The external wall 75 is cylindrical so as to define a through hole along axis Z suitable for accommodating the first limb of the first magnetic circuit, the internal wall 73 on which is wound the inner primary coil 43, the secondary coil 51 and the second magnetic circuit 61 placed around one portion of the secondary coil 51.

Preferably, the external wall 75 is shaped so that the through hole has a rectangular cross section to maintain a predefined outer gap with the secondary coil 51.

The outer primary coil 45 is wound on the surface of the external wall 75 opposite the surface of the external wall 75 oriented toward the first limb **33*a*-34*a* of the primary circuit 31**.

The edges of the external wall 75 are raised outwardly to define a groove to receive the outer primary coil 45.

The height, evaluated along axis Z, of the external wall 75 may be identical to the height of the internal wall 73.

The front spacer results from the assembly of an upper piece **74*a* and a lower piece 76*a*. Similarly, the rear spacer results from the assembly of an upper piece 74*b* and a lower piece 76*b***.

The pieces of each spacer sandwich the internal and external walls, 73 and 75, while holding the secondary coil 51, to maintain the inner primary coil, the secondary coil and the outer primary coil in their proper relative positions, i.e. in the same horizontal plane, positioned concentrically around the first limb of the first magnetic circuit, and with a predefined inner gap between the inner primary coil 43 and the secondary coil 51 on one hand and a predefined outer gap between the secondary coil 51 and the outer primary coil 45 on the other hand.

In another embodiment, the respective spacers of the frame 71 may be designed to provide preferred varying but controlled gaps between coils to achieve different purposes for the interfacing surface areas between secondary coil and inner and outer primary coils. The gaps G1 and/or G2 are then no more constant along the entire contour of the secondary coil in a XY cross-section. As an example, while the outer side 59 of the secondary coil is separated from the inner and outer primary coils to provide sufficient clearance for entry of a second magnetic circuit. The gap around the other sides of the secondary coil, in particular the inner side 58 within the opening of the first magnetic circuit, may be minimized to mitigate effects of leakage magnetic field in nearby conductors and facilitate heat transfer between the inner and outer primary coils and the secondary coil using their interfacing surface areas. To further enhance such purpose, the dielectric insulation within the inner and outer primary coils and selected walls or sections of the frame may be composed of preferred insulating materials that provide enhanced thermal conductivity using for example materials like beryllium oxide, boron nitride and alumina. Despite minimal gap between the secondary coil and the inner and outer primary coils within the opening of the first magnetic circuit for purpose of improved heat transfer and reduced leakage magnetic field in nearby conductors, the leakage impedance may be set at a preferred value by the increase of the gap between the secondary coil and the inner and outer primary coils outside the opening of the first magnetic circuit, preferably in the vicinity of the outer side 59 of the secondary coil, and the introduction of the second magnetic circuit.

In another embodiment, the function of the frame may be accomplished by a temporary holding fixture that holds inner and outer primary coils and secondary coil in preferred alignment during encapsulation or similar bonding process with a selected bonding material, while providing preferred openings for the first magnetic circuit. The temporary fixture may be removed following appropriate cure of the selected bonding material.

In this way, the positions of the secondary coil relative to the inner and outer primary coils and the secondary coil are precisely defined, limiting the manufacturing dispersion and consequently the uncertainty on the values of the characteristic operative parameters of the electric elementary transformer, in particular its total leakage impedance.

In practice, the secondary magnetic circuit is designed in order to control the precise value of the total leakage inductance and limit the deviation from this precise value.

OTHER EMBODIMENTS

While the preferred embodiment applies to a three-phase transformer, the person skilled in the art will understand that its teaching can be directly applied to other types of transformer, in particular for two-phase transformers.

If in the embodiment shown, the elementary transformer is provided with a two-limb core and one winding assembly per limb. However, alternatively, it can be provided with another number of limbs (for example three) and/or a number of winding assemblies equal to or lower than the number of limbs (for example only one winding assembly on the central limb).

For the three-phase transformer (and more generally to a multiple phase transformer with an arbitrary number of orthogonal phases), the total number of limbs of the set of elementary transformer can be reduced thereby affording volume reduction.

APPLICATIONS AND BENEFITS

The electric transformer according to the invention is particularly compact, while exhibiting a controlled leakage impedance, that may be set to high values depending on the intended use. In addition it exhibits a tolerance on the value of total impedance that is lower than 10%.

The electric transformer according to the invention can benefit power electronic applications that usually require using additional inductive and/or capacitive components in primary or secondary circuits. In particular, the electric transformer according to the invention is well suited for Dual Active Bridge applications since a preferred value of the total impedance is beneficial to the transformer transfer function for these applications to reduce switching loss and facilitate bidirectional power flow.

The electric transformer according to the invention provides this preferred value of the total impedance without additional components while mitigating eddy current losses since the leakage magnetic field associated with the leakage impedance LS is well controlled within the second magnetic circuit with reduction of leakage magnetic field intensity at conductor surfaces.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An electric transformer comprising:

a winding assembly, the winding assembly comprising a primary coil and a secondary coil; and a first magnetic circuit, the first magnetic circuit magnetically coupling the primary and secondary coils, wherein the first magnetic circuit comprises a first limb and a second limb connected together by an upper and a lower yoke to form a magnetic loop around a central passage, the first limb extending along a vertical axis, wherein the primary coil comprises an inner primary coil and an outer primary coil, the inner and outer primary coils being connected in series and wound around the first limb of the first magnetic circuit, wherein the secondary coil is wound around the first limb of the first magnetic circuit, wherein the inner primary coil, the secondary coil, and the outer primary coil are cylindrical and arranged concentrically around the vertical axis so that the inner primary coil is received inside the outer primary coil and the second coil is accommodated between the inner and outer primary coils, wherein the winding assembly forms a column around the first limb, wherein the inner primary coil, the secondary coil, and the outer primary coil are mounted in a manner to maintain a predefined inner gap between the inner primary coil and the secondary coil and a predefined outer gap between the secondary coil and the outer primary coil, the inner and outer gaps being evaluated along a radial direction relative to the vertical axis, the inner and outer gaps increasing a leakage of a magnetic flux between the primary coil and the secondary coil, and wherein the winding assembly further comprises a secondary magnetic circuit, forming a magnetic loop around the secondary coil only, the secondary magnetic circuit extending, in a horizontal plane transverse to the vertical axis, along a portion of the secondary coil, the second magnetic circuit amplifying the leakage of the magnetic flux between the primary coil and the secondary coil.

2. The electric transformer according to claim 1, wherein the secondary magnetic circuit has a vertical cross section whose internal contour fits a vertical cross section of the secondary coil and whose outer contour fits an interspace between the inner and outer primary coils.

3. The electric transformer according to claim 1, wherein, horizontal cross-sections of the first limb, the inner primary coil, the secondary coil and the outer primary coil being generally rectangular, the secondary magnetic circuit extends along a side of the secondary coil.

4. The electric transformer according to claim 1, wherein the secondary magnetic circuit is provided with air gaps.

5. The electric transformer according to claim 1, wherein an area of a horizontal cross-section of the second magnetic circuit defines a total leakage inductance of the electric transformer.

6. The electric transformer according to claim 1, wherein the electric transformer further comprises a frame made up of the assembly of an inner wall to support the inner primary coil and an outer wall to support the outer primary coil, and a plurality of spacers to assemble the internal and external walls together while holding the secondary coil, the inner and outer primary coils in predefined positions.

7. The electric transformer according to claim 6, wherein the winding assembly further comprises a second magnetic circuit, forming a magnetic loop around the secondary coil only, the secondary magnetic circuit extending, in a horizontal plane transverse to the vertical axis, along a portion of the secondary coil, the second magnetic circuit amplifying the leakage of the magnetic flux generated between the primary coil and the secondary coil, the second magnetic circuit being embedded into the frame.

8. The electric transformer according to claim 6, wherein, the winding assembly that forms the column around the first limb of the first magnetic circuit being a first winding assembly, the electric transformer comprises a second assembly forming a column around the second limb of the first magnetic circuit, the second assembly being symmetrical to the first assembly.

9. The electric transformer according to claim 1, wherein the electric transformer is a two-phase transformer or a three-phase transformer.

* * * * *